(No Model.)

F. BALLARD.
Two Wheeled Vehicle.

No. 241,906. Patented May 24, 1881.

WITNESSES.
C. B. Taylor.
W. A. Bertram.

INVENTOR
Fred. Ballard.
BY
L. D. Williams.
ATTORNEY.

United States Patent Office.

FREDERICK BALLARD, OF BALTIMORE, MARYLAND.

TWO-WHEELED VEHICLE.

SPECIFICATION forming part of Letters Patent No. 241,906, dated May 24, 1881.

Application filed February 3, 1881. (No model.)

*To all whom it may concern:*

Be it known that I, FREDERICK BALLARD, of Baltimore city, State of Maryland, have invented certain new and useful Improvements in Two-Wheeled Vehicles; and I hereby declare the same to be fully, clearly, and exactly described as follows, reference being had to the accompanying drawings, in which—

Figure 1:
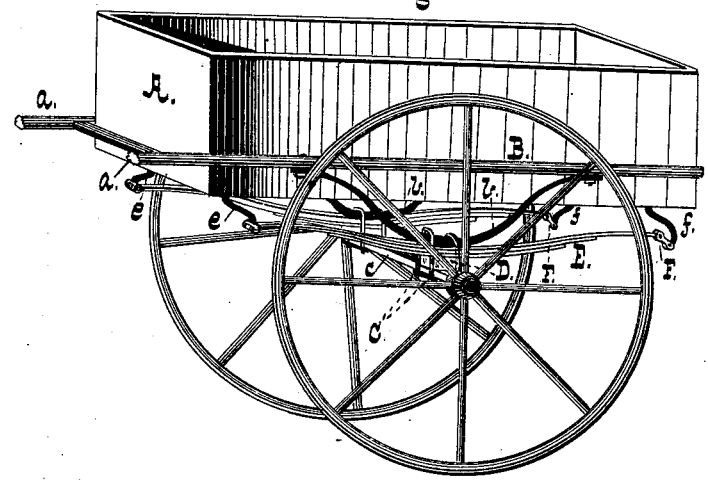
Figure 2:
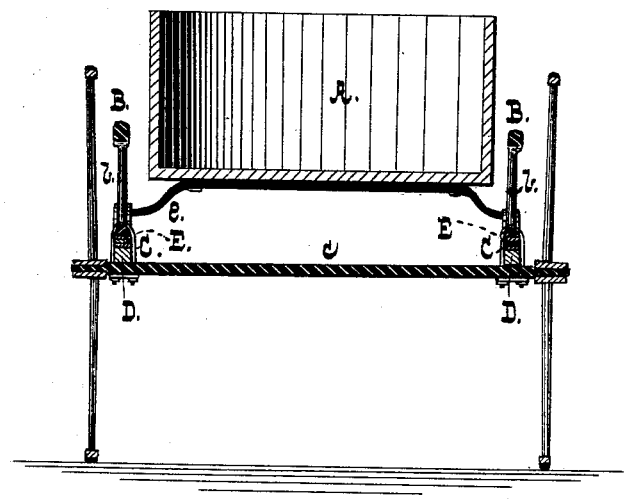

Figure 1 is a perspective view, and Fig. 2 a transverse sectional view, of the device.

My invention has reference to two-wheeled vehicles; and it has for its object to lessen the jolting of the body and prevent the rocking or tilting of the same due to the up-and-down motion of the shafts; and it consists in a system of springs, side-bars, and braces, combined and arranged as hereinafter set forth.

In the drawings, A is the body, supported upon the axle $c$ by means of brace-irons $e\ f$, to which the body is bolted. The forward irons are hinged to the ends of the springs, and the rear irons are attached to the springs at the rear by clips F. The shafts $a$ are extended at each side of the body, forming side bars, B, which are bolted to curved supporting-irons $b$, which rest on the springs. Between the latter and the axle are blocks D, the whole being securely attached to the axle by clips C, of the usual construction. Such is the construction of the cart or wagon.

In use, any vertical movement of the shafts due to the action of the horse is simply referred to the axle, and no rocking or tilting of the body is perceptible, the springs subserving the double function of destroying the motion due to the rising and falling of the shafts and of yielding with the ordinary inequalities of the roadway.

The vehicle is symmetrical in appearance, and leaves nothing to be desired in point of ease of running.

What I claim is—

1. In combination with the shafts extending to form side bars, as described, the supports $e\ f\ b$ and springs E, arranged and operating as set forth.

2. In combination with the body A, the shafts extending to form side bars, B, the curved supports $e\ f\ b$, and clips C, securing the springs and supports $b$ to the axle, as described.

FREDERICK BALLARD.

Witnesses:
R. D. WILLIAMS,
JNO. T. MADDOX.